United States Patent
Herzinger et al.

(10) Patent No.: US 7,586,994 B2
(45) Date of Patent: Sep. 8, 2009

(54) INTERFACE APPARATUS AND METHOD FOR DATA RECOVERY AND SYNCHRONIZATION

(75) Inventors: Stefan Herzinger, München (DE); Christian Münker, München (DE); Burkhard Neurauter, Linz (AT)

(73) Assignee: Infineon Technologies AG, Munich (DE)

( * ) Notice: Subject to any disclaimer, the term of this patent is extended or adjusted under 35 U.S.C. 154(b) by 597 days.

(21) Appl. No.: 11/055,740

(22) Filed: Feb. 10, 2005

(65) Prior Publication Data

US 2005/0190823 A1 Sep. 1, 2005

(30) Foreign Application Priority Data

Feb. 13, 2004 (DE) .................. 10 2004 007 239

(51) Int. Cl.
*H04L 27/20* (2006.01)
(52) U.S. Cl. ..................... 375/295; 375/259
(58) Field of Classification Search ............. 375/295, 375/140; 370/485; 365/230
See application file for complete search history.

(56) References Cited

U.S. PATENT DOCUMENTS

| 5,477,502 | A | * | 12/1995 | Hayashi .............. 365/230.05 |
| 6,032,033 | A | * | 2/2000 | Morris et al. ............ 455/277.2 |
| 6,278,731 | B1 | * | 8/2001 | Galperin ..................... 375/229 |
| 7,003,049 | B2 | * | 2/2006 | Hietala ....................... 375/295 |
| 7,062,231 | B2 | * | 6/2006 | Chominski .................. 455/91 |
| 2002/0122478 | A1 | * | 9/2002 | Hirasaki | |
| 2003/0031267 | A1 | | 2/2003 | Hietala | |
| 2003/0045249 | A1 | * | 3/2003 | Nielsen | |
| 2003/0156603 | A1 | * | 8/2003 | Rakib et al. ................. 370/485 |
| 2004/0013177 | A1 | * | 1/2004 | Sorrells et al. | |
| 2004/0015314 | A1 | * | 1/2004 | Mayer ........................ 702/117 |
| 2004/0196926 | A1 | * | 10/2004 | Chien et al. ................. 375/316 |
| 2004/0202027 | A1 | * | 10/2004 | Kuzmenka et al. ..... 365/189.05 |
| 2004/0223553 | A1 | * | 11/2004 | Kumar | |
| 2005/0163256 | A1 | * | 7/2005 | Kroeger | |

FOREIGN PATENT DOCUMENTS

EP 1 335 498 A2 8/2003

* cited by examiner

*Primary Examiner*—Dac V Ha
(74) *Attorney, Agent, or Firm*—Eschweiler & Associates, LLC

(57) ABSTRACT

The invention provides an interface apparatus for data recovery which supplies an analog signal (applied to the input and containing data in line with a coding) having a first component and a second component to a signal processor. From this, the signal processor produces a continuous, demodulated data stream. The data stream is supplied to a connected delay unit, whose output is designed to provide the stored data symbols and whose delay in provision can be set by a signal at a control input. The interface allows a digital modulator to be connected to an analog I/Q interface on a baseband unit.

14 Claims, 3 Drawing Sheets

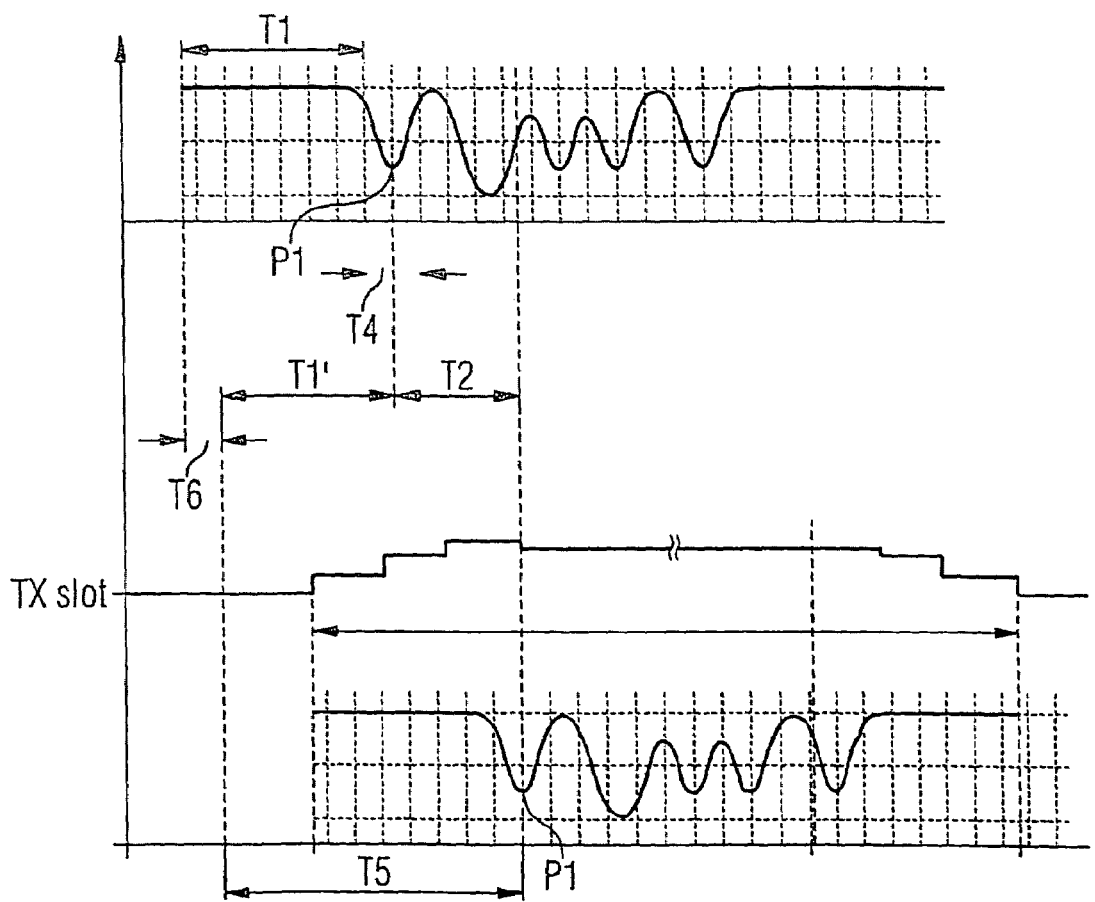

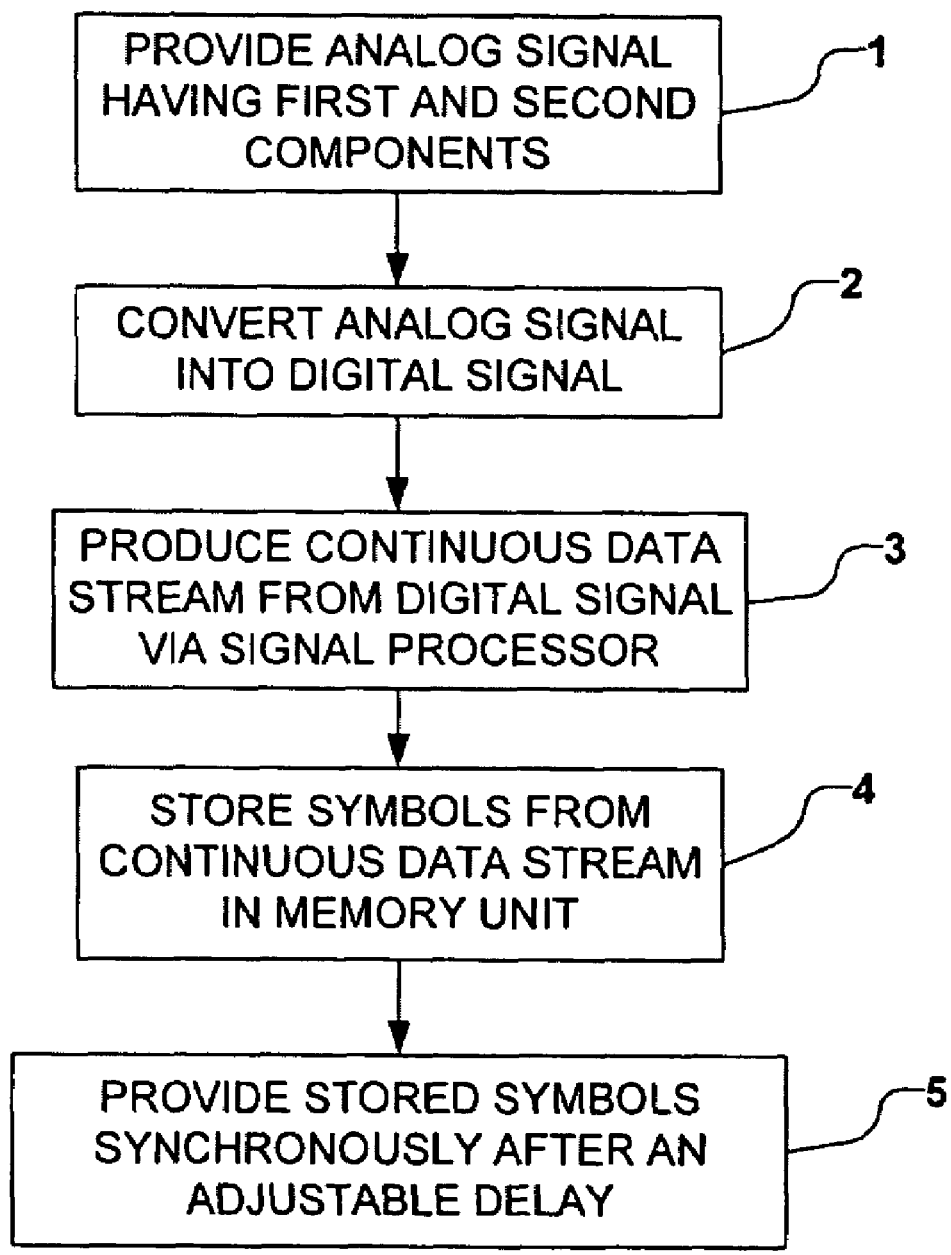

INTERFACE APPARATUS AND METHOD FOR DATA RECOVERY AND SYNCHRONIZATION

REFERENCE TO RELATED APPLICATIONS

This application claims the benefit of the priority date of German application DE 10 2004 007 239.6, filed on Feb. 13, 2004, the contents of which are herein incorporated by reference in their entirety.

FIELD OF THE INVENTION

The invention relates to an interface apparatus for data recovery. The invention also relates to a method for data recovery and synchronization and to a use for the interface apparatus.

BACKGROUND OF THE INVENTION

Transmitters for mobile radios normally comprise a baseband unit having an analog interface for outputting a complex baseband signal with an inphase component I and a quadrature component Q. This interface is standardized and is called the I/Q interface of the baseband unit. The baseband unit processes the information or data to be sent, which is/are in the form of a bit sequence. The bits are coded on the basis of a selected modulation type and result in a complex baseband signal which thus represents a sequence of data symbols.

The analog I/Q interface of the baseband unit then has a radio-frequency unit connected to it which converts the analog baseband signal to the transmission frequency. In known embodiments, the conversion is performed by a special mixer called an I/Q modulator.

In more recent transmission arrangements, however, the baseband signal is converted to the RF transmission frequency using a "digital modulator" whose inputs are designed to supply digital information or data preferably in the form of digital baseband signals, for example digital I and Q signals. Such digital modulators are used primarily in transmission devices in the GSM mobile radio standard. The modulation type used by the standard is frequency shift keying, which is particularly simple to implement in digital modulators. However, it is not possible to connect a digital modulator to a known analog standard I/Q interface on a baseband unit on account of the analog output signals from the baseband unit in the case of these transmission devices.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to an arrangement that is operable to couple an analog I/Q interface and a digital modulator. The invention also includes a method of conditioning analog I and Q signals for a digital modulator.

In one embodiment of the invention, an interface apparatus, an "I/Q digital adapter", comprises an analog/digital converter unit. The analog/digital converter unit is configured to receive an analog signal with a first and a second component and convert the analog signal into a discrete-value signal with a first and second component. The analog signal represents a data symbol or a sequence of data symbols based on a coding. The output of the analog/digital converter unit has a signal processor unit connected thereto that sends as an output a discrete-value signal that corresponds to a data symbol in the analog signal supplied to the input of the analog/digital converter unit. The signal processor is thus designed to demodulate a signal applied to the input into the data symbols and to send these data symbols to an output. The output of the signal processor is connected to a delay unit. The delay unit has an output for supplying the data symbols with a delay time that is adjustable based on a signal at a control input thereof.

The interface arrangement thus converts an analog signal (applied to the input) comprising the two components back into a sequence of data symbols and outputs this sequence with a delay to an output. The latter performs data recovery. In one expedient embodiment, the two components comprise the inphase and quadrature components I and Q. The data symbols preferably contain the two logic states "0" and "1". Depending on the coding selected, precisely one of the two logic states is contained in the data symbol. However, a plurality of logic states may also be combined to form a data symbol.

The signal which can be tapped off at the output of the interface apparatus therefore comprises a sequence of data symbols or logic states, with a delay time between the signal applied to the input and the output signal being able to be set. The sequence of data symbols is then supplied to a digital modulator which contains a modulation element with phase and/or frequency modulation. A digital modulator of this type can easily be operated on an analog-standard I/Q interface on a baseband unit using the inventive interface apparatus.

In one embodiment of the invention the analog/digital converter unit comprises two analog/digital converters, with a first analog/digital converter being connected to a first component of the analog signal applied to the input, and the second analog/digital converter being connected to a second component of the analog signal applied to the input.

In another embodiment of the invention, the signal processor is designed to detect a frequency change or a change in the direction of rotation of the phase angle. Depending on the data content of the signal which is applied to the input, the inphase component I and the quadrature component Q change their amplitude and also their phase with respect to one another. In the total signal comprising the inphase component and the quadrature component, this results in a change in the amplitude and in a change in the direction of rotation of the phase from a positive direction to a negative direction or vice versa, or in frequency shift keying. As a result of the signal processor's detection of such a change, the exact time of a change of symbol in the analog baseband signal is therefore known. This is advantageous particularly if the signal processor comprises a synchronization output for outputting a synchronization signal. Synchronization between the input signal and the output signal is easily performed preferably where there is a transition between two symbols in the analog baseband signal. In the case of pulse-modulated signals, it is thus a simple matter to identify the start of the pulse.

In another embodiment, the synchronization output of the signal processor has a clock generator connected downstream thereof. The clock generator is configured to produce a clock signal which is in sync with the synchronization signal, and is coupled to a clock signal input on the delay unit. In this embodiment, the signal processor produces not only the demodulated data symbols but also a synchronization signal which is supplied to the clock generator. The clock signal produced by the clock generator is in sync with, and phase locked with respect to, the demodulated data symbols which are output by the signal processor. In particular, the clock signal from the clock generator can thus have a fixed phase relationship with respect to the symbol frequency of an analog baseband signal which is applied to the input. The subsequent signal processing is thus significantly simplified.

In another embodiment of the invention, it is advantageous if the symbol input of the delay unit has a flipflop circuit connected thereto whose data output is coupled to a memory unit. Preferably, the clock signal input of the flipflop circuit is connected to the clock generator. Upon every pulse from the clock generator, the flipflop circuit forwards the symbol applied to its data input to its output and hence to the memory device. Symbols are advantageously stored in the memory unit in sync with the symbol frequency.

In another embodiment of the invention, the memory unit in the delay unit is designed to have a number of memory cells, with a maximum delay of the delay unit (when providing the stored data symbols at the output of the delay unit) being derived from the number of memory cells. Expressed another way, the number of memory cells gives the maximum delay for providing the data symbols.

The delay makes it possible to achieve a shift in time between the transmitted RF signal and the baseband signal applied to the input. This advantageously facilitates a situation in which the output signal from the transmitter implemented by the digital modulator is not shifted in line with the analog baseband signals.

In another advantageous embodiment of the interface apparatus, the control input of the delay unit is connected to an address unit which is designed to read the content of the memory cells and to provide the content of the memory cells at the output. Preferably, a memory cell is always read at a particular time, for example, when there is a change of symbol by the analog baseband signal, which time is detected by the digital signal processor.

In yet another embodiment of the invention, the method for data recovery and for synchronization comprises providing an analog signal with a first component and a second component having data symbols coded therein. The analog signal is converted into a discrete-value signal of data symbols with a first and a second component. The data symbols coded are decoded by demodulation, extracted, and stored in a memory unit. Finally, the symbols stored in the memory unit are read with an adjustable delay and at an adjustable reading rate.

Therefore it is possible to recover the data in an analog baseband signal, and forward the data to a digital modulator for the purpose of modulation onto a transmission signal in a transmission path.

In one advantageous embodiment, the data is modulated by converting the discrete-value signal into a second signal whose frequency is shifted when there is a change in a coded data symbol in the discrete-value signal. The second signal is therefore frequency-modulated on the basis of the data content of the discrete-value signal. In that case, the frequency of the second signal is detected and a decoded data symbol is produced therefrom on the basis of the detected frequency. Preferably, phase modulation may also be used instead of frequency modulation.

In another advantageous embodiment of the method, a synchronization signal is produced on the basis of a particular coded data symbol in the analog signal. In the case of a pulsed analog signal, this is preferably the time of the first frequency change. On the basis of the synchronization signal, a clock signal is produced. The decoded data symbols are stored in the memory unit on the basis of the clock signal produced. The decoded data symbols are thus stored in the memory unit only from the synchronization time onward. Preferably, the frequency of the clock signal in this case is chosen such that it corresponds to the symbol frequency of the analog signal which is applied to the input.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in detail below using exemplary embodiments with reference to the drawings, in which:

FIG. 3 is a timing diagram illustrating the delay and the common synchronization in one embodiment of the present invention, and FIG. 4 is a flow chart diagram illustrating an exemplary embodiment of the method of the present invention.

DETAILED DESCRIPTION OF THE INVENTION

Figure 1:
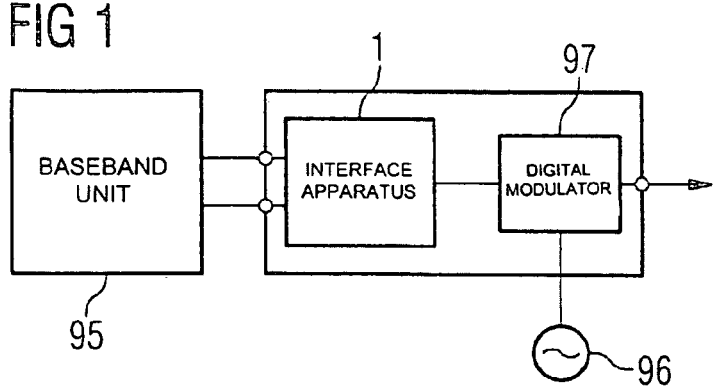
FIG. 1 is a block diagram illustrating a transmission arrangement with the interface apparatus of the present invention.

FIG. 1 shows the use of an inventive interface apparatus 1, subsequently called an I/Q digital adapter, in a transmission path in a transmitter for the GSM mobile radio standard. In this arrangement, the transmission path comprises a baseband unit 95 which is designed to process digital data to be transmitted to produce a complex baseband signal. The output connections, which are respectively of differential design, are thus used to output the inphase component and the quadrature component. The two components combined represent a sequence of data symbols. In one example, on the basis of the modulation type which is used for the GSM mobile radio standard, the complex-value baseband signal forms frequency shift keying, with each frequency corresponding to a data symbol "0" or "1".

The output connections are connected to an input on an I/Q digital adapter 1. The I/Q digital adapter demodulates the analog baseband signal and produces the data symbols again therefrom, which it sends to a digital modulator 97. The digital modulator 97 comprises a transmitter, having a local oscillator signal connection to which a local oscillator 96 with a digital and/or analog control input is connected. From the data stream provided by the I/Q digital adapter, the digital modulator 97 produces a signal at a transmitter frequency using the local oscillator, and this signal is subjected to frequency shift keying in line with the data stream.

Figure 2:
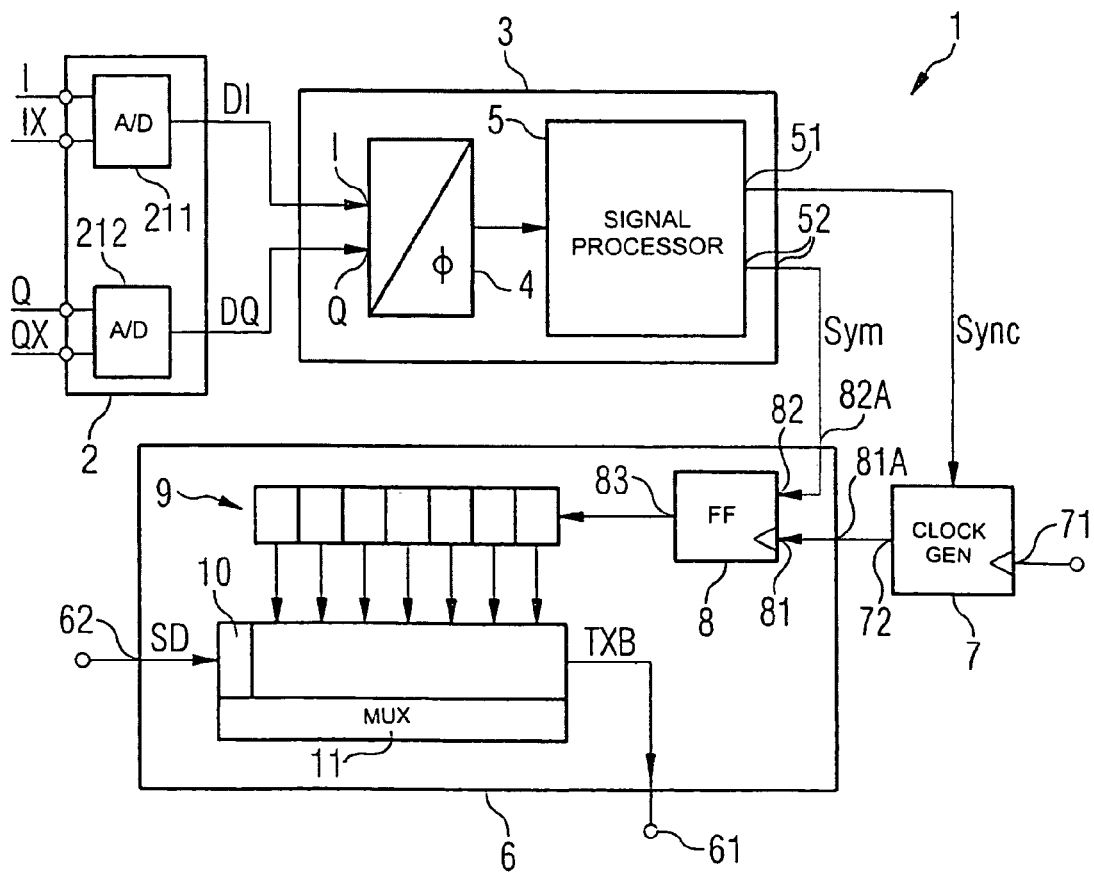
FIG. 2 is a block diagram illustrating an exemplary embodiment of the interface apparatus of the present invention.

An embodiment of the inventive I/Q digital adapter as is provided for connection to an analog standard interface is shown in FIG. 2. The I/Q digital adapter has an input for an analog baseband signal with the inphase component I and the quadrature component Q. The two components are respectively in the form of differential components I, IX and Q, QX. The input connections for the difference signal I and IX which forms the inphase component are connected to a first analog/ digital converter 211. A second analog/digital converter 212 is connected to the two input connections for the second component Q or QX, which is in differential form. The two analog/digital converters 211 and 212 form the analog/digital converter unit 2.

They convert the two difference signals into a respective digital signal DI or DQ. The two outputs of the converter unit 2 are routed to two inputs I and Q on the signal processor unit 3. The two input connections I and Q on the signal processor unit 3 have a circuit 4 connected to them which produces a phase signal therefrom. The output of the circuit 4 is connected to an input on a signal processor 5. The signal processor 5 is designed to convert a signal which represents a phase at its input into a signal which represents a frequency and to detect a change of frequency in the signal which represents a frequency. Detection is performed in the embodiment by comparing the frequency with values from a table which is stored in the signal processor 5. Depending on the frequency of the signal, the signal processor 5 produces a sequence of data symbols at its output 52.

The modulation type used in the GSM mobile radio standard is frequency shift keying. In this case, one bit is coded per data symbol, and a change of frequency thus also produces a change of bit. The significance of this modulation type is one. For other standards, it is entirely possible for the significance to be greater. By way of example, the WCDMA standard uses QPSK modulation, which codes two bits per data symbol, and such variations are contemplated by the present invention.

The signal processor 5 produces a sequence of data symbols at its output at a defined symbol rate, that is to say a number of data symbols per unit time. In the example, this is a sequence of bits, with a bit state which is the complement of the preceding bit state being sent to the output when there is a change of frequency in the signal.

A second output 51 forms an output for a synchronization signal. For a particular change of frequency, the signal processor 5 produces a synchronization signal. The synchronization time is obtained for a particular change of symbol in a baseband signal with the two components I and Q which is applied to the input. In the exemplary embodiment which is provided for the GSM standard, the time slot method used means that the synchronization signal is produced at the start of a new transmission time slot which is indicated by a change of data and hence a change of frequency.

This means that it is possible to synchronize all signal-processing circuits downstream. Additionally, the synchronization signal (and also the changes of frequency) can be used to reconstruct a symbol clock. Such a signal may be used, by way of example, as a reference signal for digital phase locked loops in a connected digital modulator.

In the embodiment shown in FIG. 2, the synchronization signal is supplied to a Reset input on a clock generator 7. The clock generator is preferably in the form of a counter which restarts a counting operation upon a Reset input. The clock generator thus operates as a frequency divider and outputs a clock signal at a particular frequency at its output 72. In this case, the frequency of the output clock signal is obtained from a reference signal applied to an input connection 71, the clock rate of said reference signal corresponding to the symbol clock rate multiplied by an oversampling factor.

The clock signal at the output 72 of the clock generator 7 is supplied to a clock signal input 81 on a flipflop circuit 8 in a delay circuit 6. In addition, the flipflop circuit 8 comprises a data input 82 which is connected to the symbol output 52 of the signal processor 5.

An output 83 on the flipflop circuit 8 is connected to a memory unit 9, which contains a multiplicity of individual memory cells, and is in a form such that the symbols applied to the input 82 are stored in one of the memory cells in the memory unit 9 upon every pulse of the clock signal at the input 81. In this case, the memory unit 9 is part of a larger unit containing an address unit 10 and a multiplexer unit 11, as shown. To control reading of the individual memory cells within the memory unit 9, the unit comprises a control input for the control signal SD. Information is read by addressing the individual memory cells using the addressing unit 10 on the basis of the control signal SD which is applied. The data symbols TXB are provided at the output 61.

A signal applied in analog form with the components I, IX and Q, QX is converted into the digital components DI and DQ by the two analog/digital converters 211 and 212 and is supplied to the unit 4. This produces a signal therefrom which is represented by a phase. This signal is converted into a corresponding frequency signal in the signal processor 5 and is processed further. Since the modulation type used in the baseband signal is frequency shift keying, a change of symbol is obtained through a change of frequency. The symbol rate used is stipulated in the GSM mobile radio standard.

A frequency offset of +67 kHz in the positive direction with respect to a center frequency corresponds to the logic state "1", and a frequency offset of −67 kHz corresponds to the logic state "0". The states, which simultaneously form the data symbols on the basis of the single-value modulation type, are output as digital signals at the symbol rate at the output 52. The signal processor knows the symbol rate. By detecting a change of frequency, it thus automatically synchronizes itself to the input signal and produces the data symbols at the symbol rate from the input signal.

At the same time, a synchronization signal is output at the synchronization output 51 when a particular event occurs. The event may be the start of a pulse in the case of a GSM signal, for example.

The synchronization signal Sync starts the clock generator 7. The generator produces a clock signal at its output 72 at a frequency associated with the symbol rate or in a fixed ratio with respect thereto. In the exemplary embodiment, the clock rate is produced at the output from the reference signal which is applied to the input, said reference signal corresponding to the bit or symbol rate multiplied by an oversampling factor. The oversampling factor must be taken into account when storing the symbols which are output at the output of the signal processor 5 and during the subsequent signal processing.

The symbols applied to the output 52 and to the input 82 are written to one of the shift register cells 9 by the flipflop circuit in line with the clock signal, for example upon every rising edge. The shift register cells are read using a signal SD. This signal is likewise derived from the synchronization signal or from the symbol frequency of signals applied to the input. By way of example, the signal SD reads the shift register cells for every change of symbol. The addressing unit provides the data symbols stored in the memory cells at the output 61 in the correct order. Reading takes place at the symbol rate of the GSM standard.

Reading and providing the symbols at the output 61 can be delayed by the signal SD, however. The maximum delay time by which provision can be delayed is in this case given by the number of memory cells multiplied by the symbol rate, at the same time taking into account the oversampling. Should the delay time be unintentionally longer, then data is lost, since sufficient memory cells are no longer available. In the present exemplary embodiment, a delay of seven symbols divided by the oversampling rate is possible.

An exemplary embodiment to illustrate the delay and the synchronization between the analog input signal and the output signal from the I/Q digital adapter can be seen in FIG. 3. The abscissa (or X-axis) in the graph represents the time. The top diagram section shows the frequency signal of the baseband signal in an incipient GSM burst. The bottom diagram section shows the frequency response of the signal transmitted by the transmitter. The transmitter is part of the digital modulator, but may also be connected downstream thereof.

During a first time period T1, the baseband signal is switched off, since the transmission time slot has not yet started. A continuous, nonvariable data stream is transmitted. In the transmitter, this data stream results in a signal of constant frequency. When a GSM burst starts, the signal amplitude of the transmission signal is simultaneously used to change the data content of the baseband. In line with the GSM standard, a defined sequence of bits is transmitted before the actual useful data. As can be seen in the top diagram section for the baseband signal, this results in a change of frequency to the other frequency. This change of frequency is detected by the signal processor in the I/Q digital adapter. This brings about the start of storage and forwarding of the data symbols to the output 61 of the I/Q digital adapter for subsequent digital modulation onto the transmission signal. In the exemplary embodiment shown in FIG. 3, the synchronization window T4 is merely two symbols wide. It is thus possible to delay transmitting the signal by this period.

In the bottom diagram section for the frequency response of the transmission signal in the transmitter, the period T5 denotes the delay which is brought about by the transmitter and to some extent the baseband. In this case, T5 is made up of the periods T1' and T2. T1' corresponds to the period T1. T2 is the delay on account of the signal chain between baseband and the transmitter. As can be seen, the point P1 is now shifted by the time period T2. In addition, however, the transmission signal from the transmitter is delayed with respect to the baseband signal by a further symbol period T6. This symbol period T6 corresponds to the delay which is set in the I/Q digital adapter and is half of the synchronization window T4. The delay allows the output signal from the digital modulator to be shifted in time with respect to the analog baseband signal without obtaining a corresponding shift in the output signal from the transmitter. Propagation time fluctuations in the transmission path can be minimized in this way.

FIG. 4 shows the individual method steps again. When an analog signal with the first and second components has been applied in step 1 and have been subsequently converted into a digital signal in step 2, the signal processor produces a continuous data stream in step 3. When a synchronization event occurs which is detected by the signal processor, the latter produces a synchronization signal and outputs it at its output. From this time onward, the symbols provided at the data output of the signal processor are stored in a memory unit in step 4. After an adjustable delay, these symbols are provided synchronously at the output of the I/Q digital adapter in step 5.

The inventive I/Q digital adapter thus allows compatibility with the present defined industrial standard for the analog I/Q interface on a baseband unit. As a result, it becomes possible to connect a digital modulator to the analog interface. The synchronization algorithm implemented allows the baseband signals to be shifted in time in a window on the basis of the depth of memory in the memory unit. The output signal from the transmitter implemented by the digital modulator is not influenced according to the analog baseband signal shift. This means that it provides a fixed time reference in relation to the output signal from the transmitter. The embodiment presented here is not limited to use for the GSM mobile radio standard. Any standard whose modulation type is known can be used so long as the signal processor can demodulate the analog baseband signal and the data symbols are forwarded to the digital modulator with an adjustable delay time.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. An interface apparatus for coupling a signal output to a signal input, comprising:
    an analog/digital converter unit having an input for receiving an analog signal with a first component and a second component, and having an output for outputting a discrete-value signal associated with the analog signal, the discrete-value signal having a first component and a second component, wherein the analog signal represents a data symbol based on a coding;
    a signal processor unit connected to the output of the analog/digital converter unit, and configured to output the data symbol represented by the analog signal to an output of the signal processor unit, wherein the signal processor unit comprises a signal processor configured to detect a frequency change or a change in a direction of rotation of the phase angle of the discrete-value signal applied to an input thereof; and
    a delay unit connected to the output of the signal processor unit, wherein the delay unit comprises a memory unit configured to store at least two data symbols and further configured to provide the data symbol at an output thereof after an adjustable delay time.

2. The interface apparatus of claim 1, wherein the memory unit comprises a plurality of memory cells for storing the at least two data symbols.

3. The interface apparatus of claim 1, wherein the memory unit comprises a plurality of shift register cells.

4. The interface apparatus of claim 1, wherein the delay unit further comprises a flipflop circuit at a data input of the delay unit, wherein an output of the flipflop circuit is coupled to the memory unit.

5. The interface apparatus of claim 1, wherein a maximum delay time in providing the data symbol at the output of the delay unit is derived from a size of the memory in the memory unit.

6. The interface apparatus of claim 1, wherein a control input of the delay unit is connected to an address unit configured to read a content in the memory unit and provide the memory unit content at the delay unit output based on a signal at the control input.

7. The interface apparatus of claim 1, wherein the signal processor unit comprises a signal processor having a synchronization output, and configured to output a synchronization signal when a particular signal applied to an input thereof is detected.

8. The interface apparatus of claim 7, further comprising a clock generator connected downstream of the synchronization output of the signal processor, wherein the clock generator is configured to produce a synchronized clock signal that is coupled to a clock signal input of the delay unit.

9. The interface apparatus of claim 8, wherein the clock generator comprises a reference input for receiving a reference signal.

10. The interface apparatus of claim 1, wherein the data symbols which are output by the signal processor unit form at least one logic state.

11. A method for data recovery and synchronization in a transmitter, comprising:
    receiving an analog signal in the transmitter comprising a first component and a second component with data symbols coded therein;
    converting the analog signal to a discrete-value signal comprising a first component and a second component with data symbols coded therein;
    decoding the data symbols from the discrete-value signal;
    storing the decoded data symbols in a memory unit in the transmitter; and
    reading the stored data symbols from the memory unit with a time delay defined by a period between the storing and the reading, wherein the time delay is adjustable,
    wherein storing the data symbols in a memory unit comprises:
        producing a synchronization signal based on a particular coded data symbol in the analog signal;
        producing a clock signal based on the synchronization signal; and
        storing the decoded data symbol in the memory unit at a timing based on the clock signal.

12. The method of claim 11, wherein decoding the coded data symbols comprises:
    converting the discrete-value signal into a second signal, whose frequency is shifted when a coded data symbol changes;
    detecting the frequency of the second signal; and
    producing a decoded data symbol based on the detected frequency.

13. A transmitter circuit for a radio frequency transmission, comprising:
    a baseband unit configured to generate and output an analog signal representing a sequence of coded symbols;
    a digital interface circuit configured to receive the analog signal and convert the analog signal into a discrete-value signal representing the data symbols; and
    a digital modulator configured to receive a local oscillator signal and the discrete-value signal and output a radio frequency transmission signal in accordance therewith,
    wherein the digital interface circuit comprises:
        an analog/digital converter configured to convert the analog signal into a digital signal;
        a phase circuit configured to receive the digital signal and generate a phase signal in response thereto; and
        a signal processor circuit configured to convert the phase signal into a signal that represents a frequency, and further configured to produce a sequence of symbols based on the frequency signal.

14. The transmitter of claim 13, further comprising a delay circuit comprising a memory unit configured to receive the sequence of symbols from the signal processor at a first time and output the sequence of symbols at a second time, wherein a time delay between the first and second times is adjustable based on a control signal.

* * * * *